June 8 1965  W. C. KIRKPATRICK  3,187,478
METHOD OF PACKAGING A PLURALITY OF ARTICLES
Filed July 5, 1960

United States Patent Office 3,187,478
Patented June 8, 1965

3,187,478
METHOD OF PACKAGING A PLURALITY OF ARTICLES
Wylie C. Kirkpatrick, Wayland, Mass., assignor to W. R. Grace & Co., Cambridge, Mass., a corporation of Connecticut
Filed July 5, 1960, Ser. No. 40,967
7 Claims. (Cl. 53—30)

This invention relates to a package and method of packaging. More particularly the invention relates to the packaging of a plurality of objects in such a manner as to permit the removal of one of the objects without otherwise affecting the package. Specifically this invention relates to the enclosing of a plurality of objects within a shrinkable plastic wrapper in such a manner that the individual objects may be separately removed from the wrapper as from a dispenser.

Accordingly it is an object of the present invention to provide a package for a plurality of objects.

A still further object is to provide a package which will also function as a dispenser for a plurality of objects.

More particularly it is an object to provide a heat shrinkable wrapper for a plurality of objects which will function both to protect the enclosed objects and also to permit the objects to be removed individually as from a dispenser leaving the other objects still protected.

There was employed in the examples below heat shrinkable, irradiated, biaxially oriented polyethylene, specifically Alathon 14, a polyethylene having an average molecular weight of 20,000, density 0.916 and a melt index of 1.8 which has been irradiated to an extent of about 12 megarad and then biaxially stretched 350% in both a lateral and longitudinal direction. The irradiated, biaxially oriented polyethylene film has a shrink energy of about 150 p.s.i. in both directions at 96° C.

Figure 1:
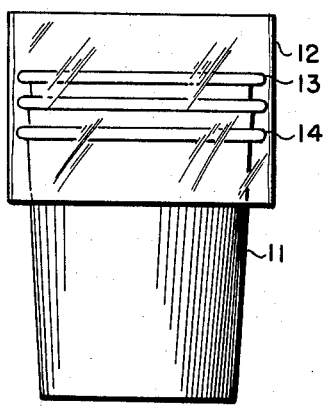
FIGURE 1 is an elevational view of a tube of heat shrinkable film enclosing a stack of nested paper cups.
Figure 2:
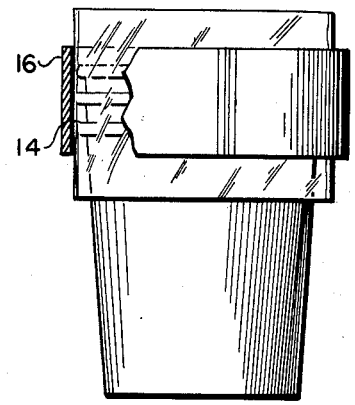
FIGURES 2 and 3 are elevational views particularly in section showing various stages in the formation of the package.
Figure 3:
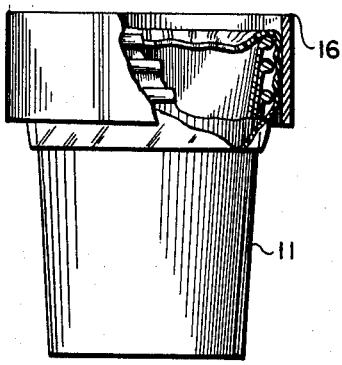
Figure 4:
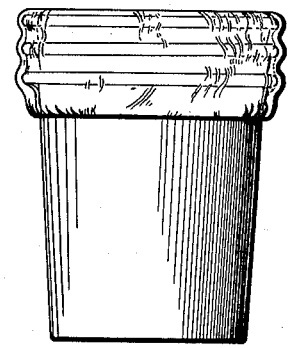
FIGURE 4 is a view of the completed package.

Referring more specifically to FIGURE 1 of the drawings, a number of paper cups 11 are stacked or nested one within the other. The paper cups have the general outline of a truncated cone and are closed at the smaller end. A tube 12 of irradiate, biaxially oriented polyethylene film approximately 1 mil thick slightly larger in diameter than the largest diameter of the cups is placed over the stack of nested cups. The tube extends approximately one inch above the rim 13 of the uppermost cup in the stack and approximately one inch below the rim 14 of the lowermost cup in the stack. There is placed around the tube a temporary collar 16 which extends from the rim of the uppermost cup to the rim of the lowermost cup as is shown in FIGURE 2. The collar serves to both hold the tube firmly against the stack of nested cups and to protect the main portion of the tube from the effects of heat. Heat in the form of hot air from a hot air blower is directed against the excess film extending above the collar and rim 13 causing the film to shrink. The film when shrunk lies flat over the open top of the cup as shown in FIGURE 3. The excess film extending below the collare and rim 14 is heat shrunk and forms a thickened elastic edge which tightly grips the lowermost cup. At this point the collar may be removed and the remainder of the film is shrunk to remove any wringles in the film and to produce a tight, neat package. The use of a collar is not absolutely essential when using a tube of film but it does make possible more selective heat shrinking of the film.

Individual cups may be removed from the package by pulling the lowermost cup. The cup will slip past the thickened elastic edge of the film if sufficient force is applied. The elastic edge will tightly surround the next cup in the stack thereby making it possible to remove individual cups while the package covering remain intact.

While the above example employed a tube of irradiated, biaxially oriented polyethylene the invention is not limited to the use of a tube since it is also possible to use a flat sheet of such film material. The sheet is wrapped above the cups and overlapped so as to form a tube. A temporary collar is again applied to hold the film tightly against the nested cups. When shrinking the top and bottom portions of the film it is necessary to apply sufficient heat to cause the overlapped portions to seal together. The collar is removed and the remainder of the film is shrunk to form a tight, wrinkle-free package. The sides of the film may be secured with adhesive or thermally sealed if desired.

The top of the package may be completely closed if there is sufficient film about the top rim 13 so that the film may be gathered and heat sealed or otherwise fastened, as by clipping, trying or glueing prior to the shrinking operation. On the other hand if the film over the top of the nested cups is shrunk so that only a small amount of film extends beyond the rim it will be possible to nest one package in the top of another package.

My invention has been described using nested paper containers as the objects being packaged. This invention is equally suitable for spherical and cylindrical objects such as tennis or golf balls, cans or jars, candy, charcoal briquets, greasy and corrosive items in lump or pellet form as well as other objects suitable for multiple packaging and dispensing. In packaging cans, for example, they are stacked on end and placed within a tube of heat shrinkable film which extends beyond either end of the stack. The excess film at one end is heat shrunk so that the edge has thickened and the diameter is slightly less than the diameter of the contents. This thickened edge of the film is elastic and will stretch to allow individual objects to be squeezed out. The opposite end may be secured in any fashion to prevent the contents from escaping, e.g. heat shrinking, trying, etc. If a snug fit is desired about the stack of cans the film may be shrunk against the cans. Sheet film may be employed in place of a tube if a thermal seal or an adhesive is employed along the side of the package so as to form a tube and to keep partially filled packages closed.

The above examples have made use of tubes of heat shrinkable film which tubes are heat shrunk at one end producing an opening of reduced diameter and a thickened elastic film edge. It is obvious that pouches of heat shrinkable material having one opening may similarly be employed in the present invention, the film about the opening being heat shrunk so as to reduce its size and to produce a thickened elastic edge. It is also possible to employ a flat sheet of heat shrinkable film in place of the tubes, or pouches described. The objects to be packaged are placed on the sheet of film and the ends of the film are gathered up and over said objects. The ends of the film are heat shrunk producing a somewhat rounded opening which is sufficiently small to prevent the object from escaping and which possess the characteristic thickened elastic edge through which the enclosed objects may be forced. A shield or collar may be used so that only the edges of the film will be exposed to the heat used in shrinking.

In general there is employed as the wrapping material in this invention a polyethylene film which has been irradiated to an extent of 2 to 100 megarad, preferably 6 to 20 megarad. The irradiation can be accomplished in conventional fashion, e.g. by the use of an electron beam generator such as the 2,000,000 volt General Electric resonant transformer unit or similar high energy particle generators of from 50,000 to 50,000,000 volts or a Van de Graaf electron generator. In addition to the use of electrons there can be employed beta rays, gamma rays, e.g. by employing Cobalt 60, etc. There can be employed any of the irradiation procedures disclosed in Baird et al. application Serial No. 713,848 filed February 7, 1959 (now U.S. Patent 3,022,543), or in Rainer et al. U.S. Patent 2,877,500. The disclosures of the Baird et al. and the Rainer et al. patents are hereby incorporated by reference.

The biaxial orientation is normally carried out to an extent of 100% to 700% longitudinally and 100% to 900% laterally. The biaxial stretching may be carried out by blowing irradiated polyethylene tubing in the manner disclosed in the Baird application. The irradiated, biaxially oriented polyethylene prepared by such a procedure has a high shrink energy, e.g. 100 to 500 p.s.i.

There can be employed as a starting polyethylene for the irradiation procedure high, low or medium density polyethylene prepared by high or low pressure techniques. The starting polyethylene can have a molecular weight of 7,000 or 12,000, or 19,000 or 21,000, or 24,000 or 35,000 or even higher.

In place of irradiated polyethylene there can also be employed irradiated solid polypropylene, solid copolymers of ethylene and propylene (e.g. a 50–50 copolymer) and solid copolymers of ethylene with a minor amount, e.g. 5% of isobutylene, amylene, acetylene, butadiene, butene 1, and butene 2 or block copolymers of polyethylene with a minor amount, e.g. 5% of polyisobutylene, and graft polymers of polyethylene or polypropylene with monomers such as acetylene, butadiene, butylene, ethylene or propylene which materials are subsequently biaxially oriented. It is also possible to employ other heat shrinkable films, e.g. films composed of non-irradiated polypropylene, oriented polyvinyl chloride, polyvinylidene chloride (saran), etc.

The invention described in detail in the foregoing specification is susceptible to changes and modifications as may occur to persons skilled in the art without departing from the principle and spirit thereof. The terminology used in the specification is for purpose of description and not of limitation, the scope of the invention being defined in the claims.

I claim:

1. A method of packaging a stack of nested frustroconical objects which comprises surrounding the stack with a tube of heat shrinkable material which extends above the open top of the stack, heat shrinking the material above the stack, and heat shrinking the bottom edge of the material causing it to thicken and form an unitary elastic edge which resiliently holds the lowermost object in the stack, said edge thus forming an opening which is sufficiently small to prevent the free passage of objects therethrough but which may be stretched to pass said objects.

2. A method according to claim 1 wherein said heat shrinkable material is an irradiated, biaxially oriented polyethylene.

3. A method of packaging which comprises enclosing a plurality of objects within a pouch of heat shrinkable film material having an opening, heat shrinking the film about said opening thereby reducing the size of the opening to less than the maximum cross-sectional area of the smallest object and forming a unitary thickened elastic film edge about said opening which opening is sufficiently small to prevent the free passage of objects therethrough but which may be stretched to pass said objects.

4. A method of claim 3 wherein said heat shrinkable film material is an irradiated biaxially oriented polyethylene.

5. A method of packaging a plurality of objects which comprises placing the objects within a tube of heat shrinkable material, heat shrinking one end of the tube to reduce the size of the opening at that end to less than the maximum cross-sectional area of the smallest object and to form a unitary thickened elastic edge which is stretchable to permit the removal of individual objects and reducing the size of the opening at the opposite end to retain the articles within the tube.

6. The method of claim 5 wherein said objects are arranged in linear fashion within said tube.

7. The method of claim 5 wherein said heat shrinkable material is an irradiated, biaxially oriented polyethylene.

References Cited by the Examiner

UNITED STATES PATENTS

| 1,337,838 | 4/20 | Hammond | 312—43 |
| 2,335,914 | 12/43 | Buttery | 221—63 |
| 2,340,090 | 1/44 | Vineburgh | 312—43 |
| 2,711,346 | 6/55 | Irwin | 53—30 |
| 2,874,521 | 2/59 | Lima | 53—30 |
| 2,877,500 | 3/59 | Rainer. | |
| 2,878,628 | 3/59 | Curry | 53—30 |
| 2,904,943 | 9/59 | Dreyfus | 53—30 |
| 2,967,383 | 1/61 | Rumsey. | |

FOREIGN PATENTS 827,246   2/60   Great Britain.

RAPHAEL M. LUPO, *Primary Examiner.*

LAVERNE D. GEIGER, SAMUEL F. COLEMAN, LOUIS J. DEMBO, *Examiners.*

UNITED STATES PATENT OFFICE

CERTIFICATE OF CORRECTION

Patent No. 3,187,478                      June 8, 1965

Wylie C. Kirkpatrick

It is hereby certified that error appears in the above numbered patent requiring correction and that the said Letters Patent should read as corrected below.

Column 1, line 30, for "particularly" read -- partially --; line 47, for "irradiate" read -- irradiated --; lines 64 and 65, for "collare" read -- collar --; same column 1, line 68, for "wringles" read -- wrinkles --; column 2, line 6, for "remain" read -- remains --; line 10, for "above" read -- about --; lines 23 and 44, for "trying", each occurrence, read -- tying --; same column 2, line 64, for "possess" read -- possesses --.

Signed and sealed this 19th day of October 1965.

(SEAL)
Attest:

ERNEST W. SWIDER
Attesting Officer

EDWARD J. BRENNER
Commissioner of Patents